United States Patent
Veloso et al.

(10) Patent No.: US 10,812,563 B1
(45) Date of Patent: Oct. 20, 2020

(54) SCTP BASED COMMUNICATION VIA A SELECTED ONE OF MULTIPLE MODEMS BASED ON AVAILABLE CELLULAR RADIO ACCESS TECHNOLOGIES AND SIGNAL STATE PARAMETERS

(71) Applicant: GM GLOBAL TECHNOLOGY OPERATIONS LLC, Detroit, MI (US)

(72) Inventors: Alex J. Veloso, Rochester Hills, MI (US); Woongjin Lim, Lincolnshire, IL (US); Dipankar Pal, Sylvania, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/451,297

(22) Filed: Jun. 25, 2019

(51) Int. Cl.
| H04L 29/06 | (2006.01) |
| H04W 40/12 | (2009.01) |
| H04L 29/08 | (2006.01) |
| H04L 1/00  | (2006.01) |
| H04L 1/20  | (2006.01) |
| H04W 4/40  | (2018.01) |
| H04B 17/318| (2015.01) |

(52) U.S. Cl.
CPC .......... H04L 65/80 (2013.01); H04B 17/318 (2015.01); H04L 1/0003 (2013.01); H04L 1/203 (2013.01); H04L 65/4069 (2013.01); H04L 67/12 (2013.01); H04W 4/40 (2018.02); H04W 40/12 (2013.01)

(58) Field of Classification Search
CPC .. H04L 65/80; H01Q 15/0066; H04B 1/0053; H04W 84/12; Y02D 70/1262; Y02D 70/1264; Y02D 70/144
See application file for complete search history.

(56) References Cited

U.S. PATENT DOCUMENTS

| 5,796,808  | A  | * | 8/1998  | Scott    | ............ | H04L 5/1438 |
|            |    |   |         |          |              | 375/222     |
| 7,443,966  | B2 | * | 10/2008 | Olafsson | ............ | H04L 5/1438 |
|            |    |   |         |          |              | 379/215.01  |
| 7,573,936  | B2 | * | 8/2009  | Hung     | ............ | H04N 21/4182|
|            |    |   |         |          |              | 375/222     |
| 7,587,038  | B2 | * | 9/2009  | Easley   | ............ | H04M 3/42195|
|            |    |   |         |          |              | 379/210.01  |
| 7,634,070  | B2 | * | 12/2009 | Olafsson | ............ | H04L 5/1438 |
|            |    |   |         |          |              | 379/93.32   |

(Continued)

*Primary Examiner* — Sargon N Nano

(57) ABSTRACT

A telematics module includes modems and a modem selecting module, which communicates with a network device according to a SCTP. The modem selecting module includes RAT network and signal status modules. The RAT network module determines a RAT network availability status of each of the modems. The signal status module determines signal quality status parameters of each of the modems. The modem selecting module: determines which one of the modems has a higher data throughput based on the RAT network availability status and the signal quality status parameters of each of the modems; sets the one of the modems with the higher data throughput as an active modem and sets another modem as inactive, such that the another modem is in at least one of a standby or backup mode; and communicates with the network device via the one of the modems according to the SCTP.

20 Claims, 4 Drawing Sheets

(56) References Cited

U.S. PATENT DOCUMENTS

| | | | | |
|---|---|---|---|---|
| 8,140,358 B1* | 3/2012 | Ling | ................... | G06Q 40/08 |
| | | | | 705/4 |
| 8,279,913 B2* | 10/2012 | van Waasen | ......... | H04B 7/0691 |
| | | | | 375/219 |
| 9,635,649 B1* | 4/2017 | Amiri | ............... | H04W 72/0406 |
| 9,699,074 B2* | 7/2017 | Zhang | ................... | H04L 45/22 |
| 10,085,137 B1* | 9/2018 | Dollinger | ................ | H04W 4/80 |
| 10,633,001 B2* | 4/2020 | Ferguson | .............. | G07C 5/008 |
| 10,665,039 B2* | 5/2020 | Remboski | ............ | G07C 5/0808 |
| 2012/0286950 A1* | 11/2012 | Peariso | ............. | G08B 13/1427 |
| | | | | 340/539.1 |

\* cited by examiner

US 10,812,563 B1

SCTP BASED COMMUNICATION VIA A SELECTED ONE OF MULTIPLE MODEMS BASED ON AVAILABLE CELLULAR RADIO ACCESS TECHNOLOGIES AND SIGNAL STATE PARAMETERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to communication via multiple modems using a stream control transmission (SCTP) protocol.

A control module of a vehicle may connect to one or more cellular networks and communicate using multiple radio frequency (RF) transceivers (or modems) according to a SCTP protocol. As an example, a first modem may be used to connect to a long term evolution (LTE) network (or fourth generation (4G) broadband cellular technology network) and a second modem may be used to connect to a 3G, 4G or 5G broadband cellular technology network.

The current SCTP protocol supports multi-homing, which includes connecting a host to more than one network. A predetermined primary network is maintained as an active network until communication is "completely broken". Communication is completely broken when a connection between the host (e.g., a control module of a vehicle) and a remotely located network device is lost.

SUMMARY

A telematics module is provided and includes modems and a modem selecting module. The modem selecting module is configured to communicate with a network device according to a stream control transmission protocol. The modem selecting module includes a radio access technology (RAT) network module and a signal status module. The RAT network module is configured to determine a RAT network availability status of each of the modems. The signal status module is configured to determine signal quality status parameters of each of the modems. The modem selecting module is configured to: determine which one of the modems has a higher data throughput based on the RAT network availability status and the signal quality status parameters of each of the modems; set the one of the modems with the higher data throughput as an active modem; set one or more other ones of the modems as inactive, such that the one or more other ones of the modems is in at least one of a standby or backup mode; and communicate with the network device via the one of the modems according to the stream control transmission protocol.

In other features, a first modem of the modems is an active modem prior to the setting of the one of the modems with the higher data throughput as an active modem. The one of the modems with the higher data throughput is a second modem. The modem selecting module is configured to maintain a connection with the network device and switch a data path from the first modem to the second modem in response to determining that the second modem has a higher data throughput than the first modem.

In other features, the modem selecting module is configured to: determine which one of the modems is connected to a higher generation RAT network than another one of the modems; set the one of the modems connected to the higher generation RAT network as an active modem; and communicate according to the stream control transmission protocol with the network device via the one of the modems connected to the higher generation RAT network.

In other features, the modem selecting module is configured to: determine two of the modems connected to a same RAT network; in response to determining two of the modems are connected to a same RAT network, determine which of the two of the modems has better signal quality status parameters; set the one of the two of the modems with the better signal quality status parameters as an active modem; and communicate with the network device via the one of the two of the modems according to the stream control transmission protocol.

In other features, the modem selecting module is configured to: determine which one of the modems has best signal quality status values; and communicate according to the stream control transmission protocol with the network device via the one of the modems having the best signal quality status values.

In other features, the modems include a first modem and a second modem. The signal status module is configured to: perform a first comparison to determine whether a received signal strength indicator of the first modem is greater than a first threshold; perform a second comparison to determine whether a bit error rate of the first modem is less than a second threshold; and based on a result of the first comparison and a result of the second comparison, set the first modem as an active modem.

In other features, the signal status module is configured to: perform a third comparison to determine whether a received signal strength indicator of the second modem is greater than a third threshold; perform a fourth comparison to determine whether a bit error rate of the second modem is less than a fourth threshold; and based on a result of the third comparison and a result of the fourth comparison, set the second modem as an active modem.

In other features, the signal status module is configured to: perform a fifth comparison to determine whether the received signal strength indicator of the first modem is greater than the received signal strength indicator of the second modem; and based on a result of the fifth comparison, set one of the first modem and the second modem as an active modem.

In other features, the signal status module is configured to: perform a third comparison to determine whether a received signal strength indicator of the second modem is less than a third threshold; perform a fourth comparison to determine whether a bit error rate of the second modem is greater than a fourth threshold; and based on a result of the third comparison and a result of the fourth comparison, set one of the first modem and the second modem as an active modem.

In other features, the signal status module is configured to, based on the result of the third comparison and the result of the fourth comparison: perform a fifth comparison to determine whether the received signal strength indicator of the first modem is greater than the received signal strength indicator of the second modem plus a hysteresis value; perform a sixth comparison to determine whether the bit error rate of the first modem is less than the bit error rate of the second modem plus the hysteresis value; and based on a result of the fifth comparison and a result of the sixth comparison, set one of the first modem and the second modem as an active modem.

In other features, a method of operating a telematics module is provided and includes: communicating with a network device according to a stream control transmission protocol; determining a RAT network availability status of each of multiple modems of the telematics module; determining signal quality status parameters of each of the modems; determining which one of the modems has a higher data throughput based on the RAT network availability status and the signal quality status parameters of each of the modems; setting the one of the modems with the higher data throughput as an active modem and setting one or more other ones of the modems as inactive, such that the one or more other ones of the modems is in at least one of a standby or backup mode; and communicating with the network device via the one of the modems according to the stream control transmission protocol.

In other features, the method further includes maintaining a connection with the network device and switching a data path from a first modem of the modems to a second modem of the modems in response to determining that the second modem has a higher data throughput than the first modem. The first modem is an active modem prior to the setting of the second modem as an active modem.

In other features, the method further includes: determining which one of the modems is connected to a higher generation RAT network than another one of the modems; setting the one of the modems connected to the higher generation RAT network as an active modem; and communicating according to the stream control transmission protocol with the network device via the one of the modems connected to the higher generation RAT network.

In other features, the method further includes: determining two of the modems connected to a same RAT network; in response to determining two of the modems are connected to a same RAT network, determining which of the two of the modems has better signal quality status parameters; setting the one of the two of the modems with the better signal quality status parameters as an active modem; and communicating with the network device via the one of the two of the modems according to the stream control transmission protocol.

In other features, the method further includes: determining which one of the modems has best signal quality status values; and communicating according to the stream control transmission protocol with the network device via the one of the modems having the best signal quality status values.

In other features, the method further includes: performing a first comparison to determine whether a received signal strength indicator of a first modem is greater than a first threshold, wherein the modems comprise the first modem and a second modem; performing a second comparison to determine whether a bit error rate of the first modem is less than a second threshold; and based on a result of the first comparison and a result of the second comparison, setting the first modem as an active modem.

In other features, the method further includes: performing a third comparison to determine whether a received signal strength indicator of the second modem is greater than a third threshold; performing a fourth comparison to determine whether a bit error rate of the second modem is less than a fourth threshold; and based on a result of the third comparison and a result of the fourth comparison, setting the second modem as an active modem.

In other features, the method further includes: performing a fifth comparison to determine whether the received signal strength indicator of the first modem is greater than the received signal strength indicator of the second modem; and based on a result of the fifth comparison, setting one of the first modem and the second modem as an active modem.

In other features, the method further includes: performing a third comparison to determine whether a received signal strength indicator of the second modem is less than a third threshold; performing a fourth comparison to determine whether a bit error rate of the second modem is greater than a fourth threshold; and based on a result of the third comparison and a result of the fourth comparison, setting one of the first modem and the second modem as an active modem.

In other features, the method further includes, based on the result of the third comparison and the result of the fourth comparison: performing a fifth comparison to determine whether the received signal strength indicator of the first modem is greater than the received signal strength indicator of the second modem plus a hysteresis value; performing a sixth comparison to determine whether the bit error rate of the first modem is less than the bit error rate of the second modem plus the hysteresis value; and based on a result of the fifth comparison and a result of the sixth comparison, setting one of the first modem and the second modem as an active modem.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
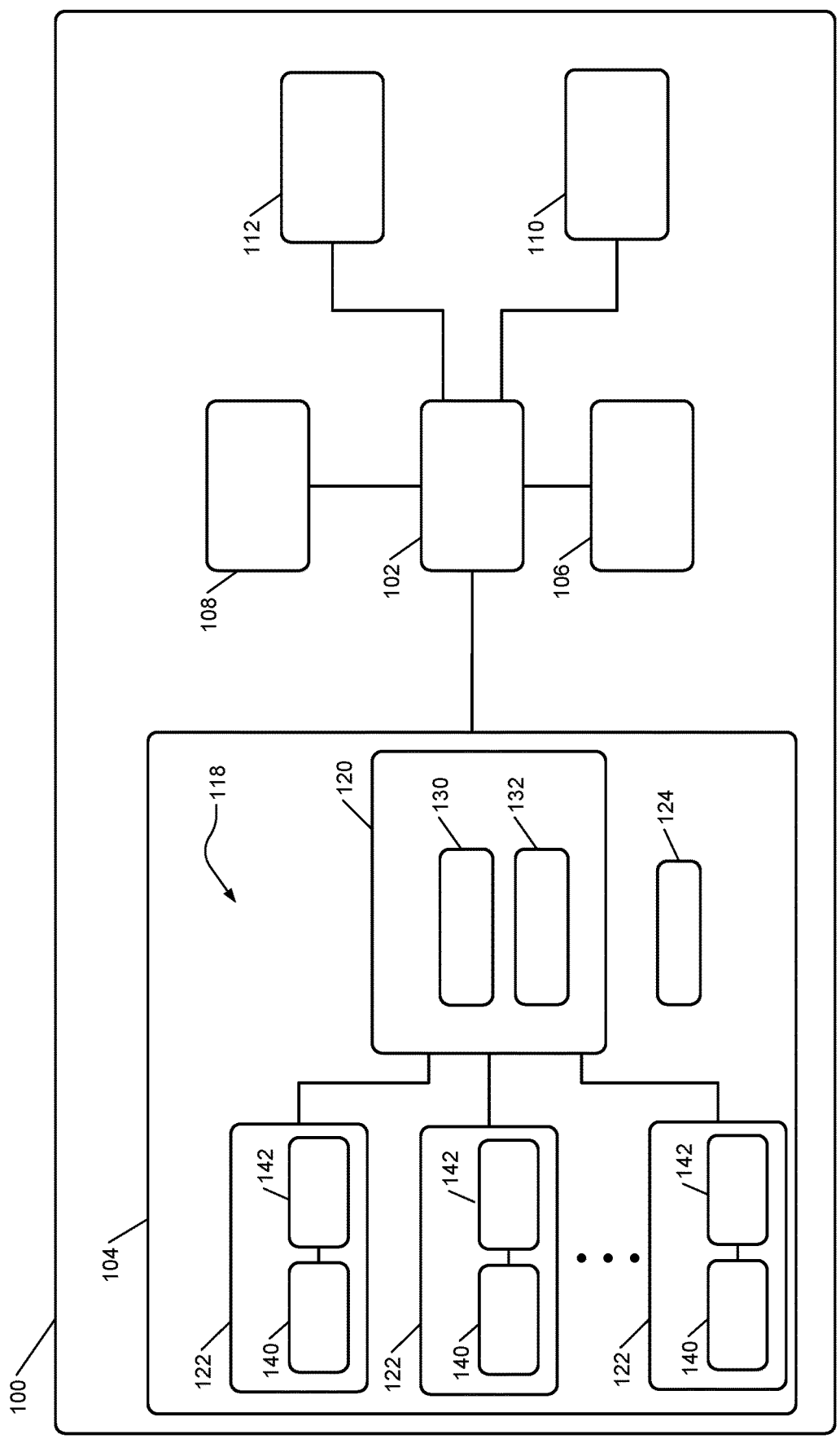
FIG. 1 is an example of a vehicle including a telematics module in accordance with an embodiment of the present disclosure.

A vehicle communication system may include a telematics module having multiple RF transceivers (or modems). The modems are configured to communicate with network devices in various cellular networks. Each modem may be configured to communicate with one or more cellular networks of a respective cellular service provider (e.g., At&T®, T-mobile®, etc.). Each modem is configured to communicate according to one or more respective radio access technologies (RATs), such as the 3G, 4G (LTE), and 5G broadband cellular network technologies. Each modem is configured to communicate according to the corresponding broadband cellular network technology protocols and on the corresponding cellular bands.

The examples set forth herein include a telematics control module that is configured to communicate according to the SCTP protocol and while communicating according to the SCTP protocol select one of multiple modems based on available RATs and signal quality state parameters, such as received signal strength indicators (RSSIs) and bit error rates (BERs). The telematics module is configured to determine the best available RAT and the best available RAT network based on signal quality state parameters. The telematics module may maintain a current connection, interrupt current communication of a first modem and switch a data path to a second modem, which has a higher throughput RAT network available and better signal quality state parameters than the first modem.

Cellular network status is monitored for a certain number of modems including attaching status and respective radio and signal quality parameters to determine whether to switch from a currently used modem to another modem. A switch between modems and away from a primary modem may occur independent of whether a link (or connection) between the primary modem and a network device is completely broken.

As an example, if a first modem is delegated from a LTE network to a 3G network while a second modem supports the LTE network, the examples disclosed herein include switching from the first modem to the second modem. This causes the first modem to be inactive (meaning awake and in a standby and/or backup mode) and the second modem to be active (meaning awake and communicating with one or more other network devices) in order to maintain a best possible throughput for the two modems by maintaining communication via the LTE network. While being in the standby and/or backup mode, the first modem may not be communicating (transmitting and receiving signals) with the one or more network devices, which are in communication with the second modem. Other examples are described below. The examples prevent use of a modem exhibiting low and/or degraded throughput when another modem with better throughput is available to provide a higher level of service. The examples maximize final throughput using multiple modems based on cellular network technology availability and corresponding signal quality state parameters.

While vehicle examples are described herein, the present application is also applicable to non-vehicle implementations.

FIG. 1 shows a vehicle 100 that includes a vehicle control module 102, a telematics module 104, a navigation module 106, an infotainment module 108, a propulsion system 110 and other vehicle systems 112. The vehicle control module 102 may control operation of the vehicle 100. The telematics module 104 provides wireless communication services. The telematics module 104 may support Wi-Fi®, Bluetooth®, Bluetooth Low Energy (BLE), near-field communication (NFC), cellular, and/or other wireless communication and/or operate according to Wi-Fi®, Bluetooth®, BLE, NFC, cellular, and/or other wireless communication protocols. In one embodiment, the telematics module 104 communicates with a network device remote from the vehicle 100 according to a SCTP protocol. The SCTP protocol refers to operation at a transport layer (layer 4 of the open systems interconnection (OSI) model). The SCTP protocol is a message oriented protocol that provides multi-homing, may use redundant paths, and ensures reliable in-sequence transport of messages.

The telematics module 104 is a network device and includes a SCTP operational modem selection system 118 that includes a modem selecting module 120, multiple transceivers (or modems) 122 and may include a global positioning system 124. The modem selecting module 120 selects: which one of the modems 122 is the active modem; which ones of the modems 122 are inactive modems and thus in a standby and/or backup mode; which one of the modems 122 is a primary (or main) modem; and which ones of the modems 122 are secondary (or alternative) modems. An active modem refers to a modem that is connected (or linked to) and communicating with a network device via a cellular network. An inactive modem refers to a modem that is either (i) connected (or linked to) and not communicating with a network device (referred to as a stand-by mode), or (ii) is not connected (or linked) to a network device.

The modem selecting module 120 includes a RAT module 130 and a signal status module 132. The RAT module 130 tracks RAT changes of the modems 122. Operations of the RAT module 130 are further described below with respect to FIG. 2B of the application. Operations of the signal status module 132 are further described below with respect to FIG. 2C of the application.

The modems 122 include physical layer (PHY) modules 140 and medium access control (MAC) modules 142. The PHY modules 140 communicate with remote network devices. The MAC modules 142 control the hardware responsible for interaction with a wireless transmission medium. The MAC modules 142 may be implemented as sublayers of data link layers. The MAC modules 142 provide flow control and multiplexing for the transmission medium.

The navigation module 106 executes a navigation application to provide navigation services. The infotainment module 108 may include an audio system and/or a video system including one or more displays to provide vehicle status information, diagnostic information, entertainment features, etc. The propulsion system 110 may include an internal combustion engine and/or one or more electric motors to propel the vehicle 200. The other vehicle systems 112 may include, for example, heating, ventilation and air conditioning (HVAC) systems, lighting systems, partially or fully autonomous vehicle systems, etc.

During operation, the modem selecting module 120 implements an algorithm to select one of the modems 122 to be an active modem based on: which of the modems 122 are available; which of the modems 122 are connected to a RAT network; which RAT networks the modems 122 are connected to; and signal quality state parameters, such as RSSI and BER, of the modems 122. Table 1 below provides various example sets of conditions. The examples of Table 1 are for a telematics module that includes at least a primary modem (PM) and a secondary modem (SM). The table indicates, for each of the sets of conditions corresponding respectively to the rows in Table 1: an operating state of the modems; which RAT networks the modems are camped (or connected) to; whether a RSSI value of a signal transmitted or received by the currently active modem is greater than a RSSI threshold and whether a BER of the signal is greater than a BER threshold; a RSSI value of a signal transmitted or received by the currently active modem is greater than or equal to a RSSI threshold plus a RSSI hysteresis value and whether a BER of the signal is greater than or equal to a BER threshold plus a BER hysteresis value. For each of the sets of conditions, Table 1 also indicates which of the PM and the SM is to be the active modem (last column of table). The modem operational state may be "online", meaning connected or may be "modem_threshold", meaning connected and exceeding a signal quality threshold. While being online, a modem may be inactive or active. While exceeding a modem_threshold, a modem may be inactive or active.

more RAT networks and thus be capable of communicating according to protocols of more than one RAT network.

Figure 2A:
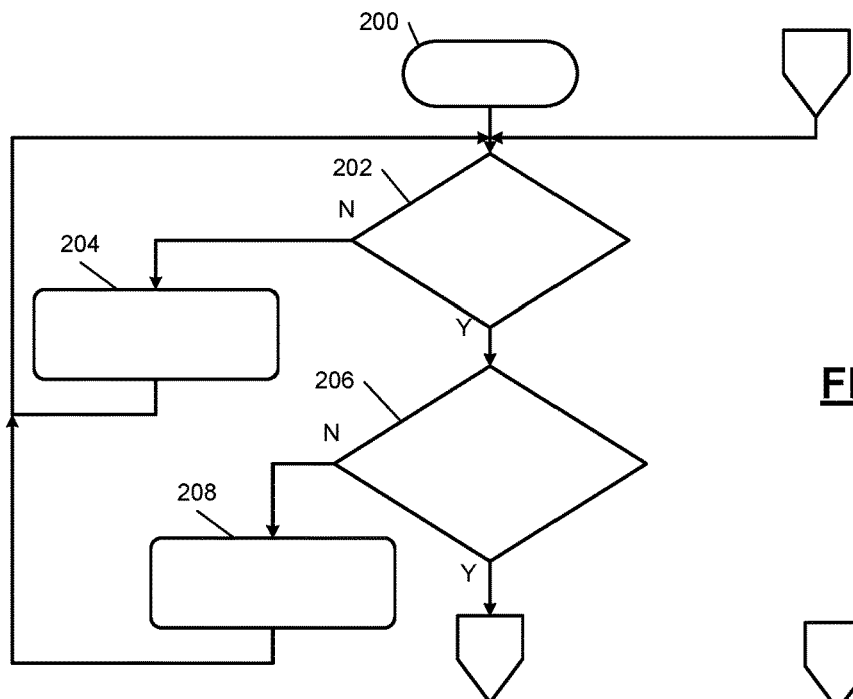
FIGS. 2A-C illustrates an example modem switching method implemented at a modem selecting module in accordance with an embodiment of the present disclosure.

The systems disclosed herein may be operated using numerous methods, example methods are illustrated in FIGS. 2A-4. In FIGS. 2A-2C, a modem switching method implemented at a telematics control module is shown. Although the following methods are shown as separate

TABLE 1

Example RAT network and signal quality conditions and corresponding active modem state transitions.

| | Modems | | | | | | | |
|---|---|---|---|---|---|---|---|---|
| | PM | | SM | | | RSSI≥RSSI_Threshold + | | |
| Example No. | Modem State | Modem Camped To | Modem State | Modem Camped To | RSSI<RSSI_Threshold and BER>BER_Threshold | RSSI_Hysteresis and BER≤BER_Threshold + BER_Hysteresis | Current AM | New AM |
| 1 | NA | 4G | NA | 3G | NA | NA | SM | PM |
| 2 | NA | 4G | NA | 2G | NA | NA | SM | PM |
| 3 | NA | 3G | NA | 4G | NA | NA | PM | SM |
| 4 | NA | 3G | NA | 2G | NA | NA | SM | PM |
| 5 | NA | 2G | NA | 4G | NA | NA | PM | SM |
| 6 | NA | 2G | NA | 3G | NA | NA | PM | SM |
| 7 | Modem-threshold | 4G | Modem-online | 4G | NA | NA | PM | SM |
| 8 | Modem-online | 4G | Modem-threshold | 4G | NA | Yes | SM | PM |
| 9 | Modem-threshold | 4G | Modem-threshold | 4G | Yes | NA | PM | SM |
| 10 | Modem-threshold | 4G | Modem-online | 4G | NA | Yes | SM | PM |
| 11 | Modem-threshold | 4G | Modem-threshold | 4G | NA | Yes | SM | PM |
| 12 | Modem-threshold | 3G | Modem-online | 3G | NA | NA | PM | SM |
| 13 | Modem-online | 3G | Modem-threshold | 3G | NA | Yes | SM | PM |
| 14 | Modem-threshold | 3G | Modem-threshold | 3G | Yes | NA | PM | SM |
| 15 | Modem-threshold | 3G | Modem-online | 3G | NA | Yes | SM | PM |
| 16 | Modem-threshold | 3G | Modem-threshold | 3G | NA | Yes | SM | PM |
| 17 | Modem-threshold | 2G | Modem-online | 2G | NA | NA | PM | SM |
| 18 | Modem-online | 2G | Modem-threshold | 2G | NA | Yes | SM | PM |
| 19 | Modem-threshold | 2G | Modem-threshold | 2G | Yes | NA | PM | SM |
| 20 | Modem-threshold | 2G | Modem-online | 2G | NA | YES | SM | PM |
| 21 | Modem-threshold | 2G | Modem-threshold | 2G | NA | YES | SM | PM |

The modem selecting module 120 may switch a primary modem to a secondary modem based on (i) signal quality status parameters and/or other cellular parameters, and (ii) available services to maximize data throughput according to a true physical capacity of each available modem. Table 1 shows example conditions where a PM and a SM can become active based on (i) which RAT network the PM and SM are camped to, and then (ii) RSSI and BER values, if both the PM and the SM are camped to a same RAT network.

In one embodiment, each of the modems 122 connects to a corresponding service provide network and does not change to connecting a different service provider network. One or more of the modems 122 may connect to a same service provider network. Two or more of the modems 122 may connect to different service provider networks. Each of the modems 122 may be configured to connect to one or methods, one or more of the methods and/or operations from separate methods may be combined and performed as a single method. For example, the methods of FIGS. 2A-4 may be combined and performed as a single method.

Figure 2B:
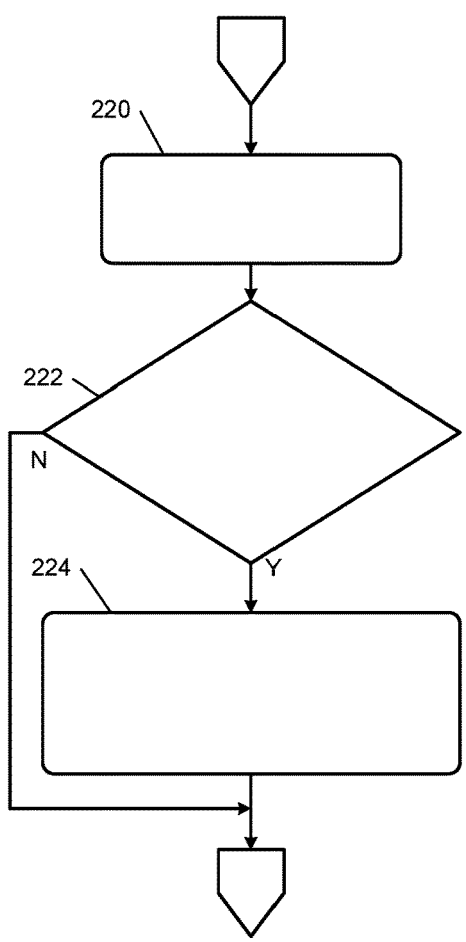
Figure 2C:
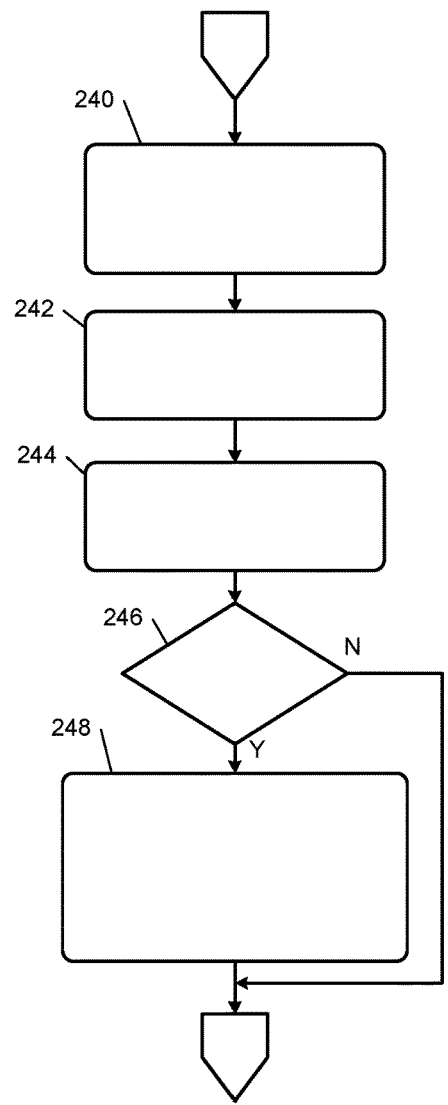
Figure 3:
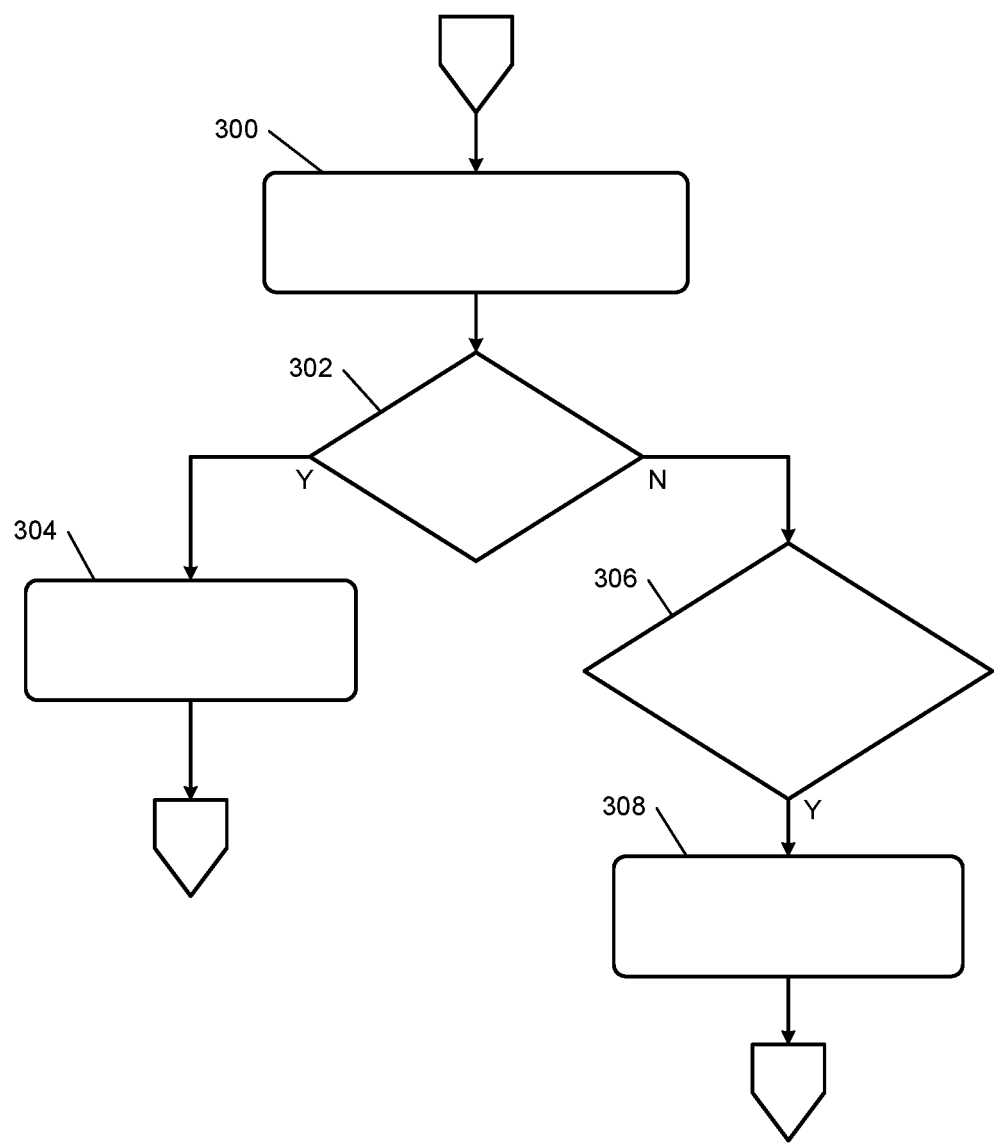
FIG. 3 illustrates an example method of detecting a radio access technology (RAT) change and a signal quality change at a modem in accordance with an embodiment of the present disclosure.
Figure 4:
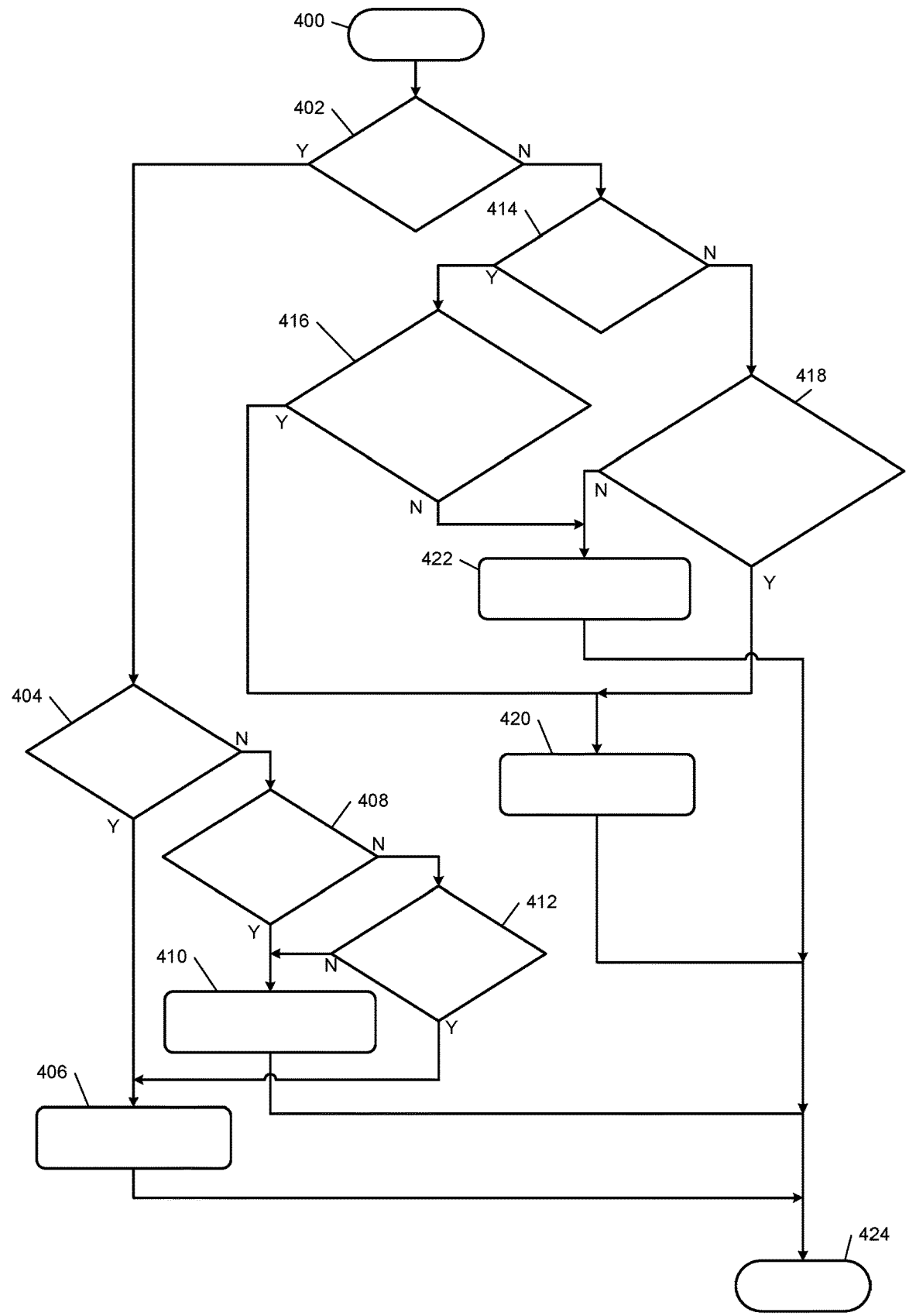
FIG. 4 illustrates an example method of setting an active modem based on signal quality via the modem selecting module in accordance with an embodiment of the present disclosure.

The operations of FIGS. 2A-2C are performed by the modem selecting module 120. The operations of FIG. 3 are performed by the each available modem (e.g., two or more of the modems 122). The operations of FIG. 4 are performed by the modem selecting module 120.

Although the following operations are primarily described with respect to the implementations of FIGS. 1-4, the operations may be easily modified to apply to other implementations of the present disclosure. The operations may be iteratively performed. The method may begin at 200. At 202, the modem selecting module 120 determines whether two or more of the modems 122 are available. The term "available" as used herein refers to a modem that is included in a telematics module and is able to establish a link to a network device of a RAT network. If two or more modems are available, operation 206 is performed, otherwise operation 204 is performed. At 204, communication is performed via an available one of the modems 122.

At 206, the modem selecting module 120 determines whether two or more of the available modems are connected to one or more network devices on one or more RAT networks. If two or more of the modems are connected, operation 300 of FIG. 3 may be performed, otherwise operation 208 may be performed. At 206, the modem selecting module 120 communicates to a network device via a connected one of the modems 122.

FIG. 3 shows a method of detecting a RAT change and a signal quality change at a modem. The following operations 300, 302, 304, 306 and 308 may be performed by each one of the modems 122 that is connected to a RAT network. Operations 300, 302, 304, 306 and 308 may be performed via the PHY module and/or the MAC module of the modem. At 300, the modem detects RAT network availability changes and signal quality changes and may record the changes in a memory of the modem. At 302, the modem determines whether a RAT network availability change has occurred. If a change has occurred, operation 304 is performed, otherwise operation 306 is performed. A RAT network availability change may include a change in availability from a first RAT network to a second RAT network, an addition of another available RAT network, or an indication that a previously available RAT network is no longer available.

At 304, the modem sends a RAT network change notification to the modem selecting module 120 indicating the RAT network availability changes. Operation 220 may be performed subsequent to operation 304.

At 306, the modem determines whether a signal quality change has occurred and moved outside a predetermined range (i.e. fallen below a first predetermined threshold or exceeded a second predetermined threshold). For example, if a signal quality state parameter (e.g., RSSI or BER) has moved outside the predetermined range, then operation 308 is performed, otherwise operation 202 may be performed. At 308, the modem sends a signal quality change notification to the modem selecting module 120 indicating the changes in signal quality. This may include sending updated RSSI and/or BER values. Operation 240 may be performed subsequent to operation 308.

The following operations 220, 222, and 224 may be performed by the modem selecting module 120 and may be performed for each modem providing a RAT network change notification. At 220, the modem selecting module 120 receives a RAT network change notification from a modem. At 222, the modem selecting module 120 determines whether one or more modems are camped on and/or are able to connect to a different available RAT network, then previously camped on. In one embodiment the modem selecting module 120 determines whether the one or more modems are camped on a different available RAT network and does not determine whether the one or more modems are able to connect to a different available RAT network. Operation 224 is performed if one or modems are camped on a different RAT network, otherwise operation 202 may be performed.

At 224, the modem selecting module 120 may set a flag to change a currently active (first) modem to another (second) modem connected to or able to connect to a higher throughput RAT network. This may be accomplished based on a RAT network switching criteria and may include informing a SCTP server or control module (e.g., the vehicle control module 102) that modem switching is to be performed, such that the SCTP server or control module may then generate messages according to the SCTP protocol, which may be transmitted via the selected one of the modems 122. The control module may be implemented as a SCTP server. As an example, the RAT network switching criteria may include comparing available RAT networks of each of the modems and the modem with the highest throughput RAT network is selected and made active. Several examples are shown by the rows of Table 2, where the modems have 2G, 3G, or 4G RAT networks available and one of a PM and a SM is selected and made active.

TABLE 2

Active Modem Selection Based on RAT Network Generation Level

| PM | SM | AM |
|---|---|---|
| 2G | 2G | PM |
| 2G | 3G | SM |
| 2G | 4G | SM |
| 3G | 2G | PM |
| 3G | 3G | PM |
| 3G | 4G | SM |
| 4G | 2G | PM |
| 4G | 3G | PM |
| 4G | 4G | PM |

As an example, the RAT network of the first modem may degrade to provide a lower throughput or the RAT network of the second modem may change and provide a higher throughput than the RAT network of the first modem. In this example, the modem selecting module 120 may signal the second modem and the corresponding control module or server to connect the second modem, if not already connected, to the higher throughput RAT network and be the active modem. The first modem is transitioned to an inactive status. The modem selecting module 120 may signal the first modem and the control module or server to transition to an inactive state. Operation 202 may be performed subsequent to operation 224.

The following operations 240, 242, 244, 246, 248 may be performed by the modem selecting module 120 and may be performed for each modem providing a signal quality change notification. At 240, the modem selecting module 120 receives the signal quality change notification from a modem.

At 242, the modem selecting module 120 obtains signal quality values for the connected modems. This may include collecting RSSI and BER values for each modem that is connected to a RAT network.

At 244, the modem selecting module 120 sets a modem switching flag based on a signal switching criteria. The modem switching flag may indicate, for example, to switch from a currently used active modem to another modem having better signal quality status parameter values. An example signal switching criteria is described with respect to the method of FIG. 4.

At 246, the modem selecting module 120 determines whether the modem switching flag is set. If the modem switching flag is set, operation 248 is performed, otherwise operation 202 is performed. At 248, the modem selecting module 120 signals the connected modems to switch, such that a first currently active modem transitions to an inactive state and a second currently inactive modem switches to an active state. This may also include informing a SCTP server or control module (e.g., the vehicle control module 102) that modem switching is being performed, such that the SCTP server or control module may then generate messages according to the SCTP protocol. The messages which may be transmitted via the selected one of the modems 122. The control module may be implemented as a SCTP server. The second modem has better signal quality state parameters than the first modem. Operation 202 may be performed subsequent to operation 248.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

FIG. 4 shows a method of setting an active modem based on signal quality via the modem selecting module 120 of the telematics module 104. The method may begin at 400. At 402, the modem selecting module 120 determines whether the currently active modem is a primary modem. If the currently active modem is the primary modem, then operation 404 is performed, otherwise operation 408 is performed.

At 404, the modem selecting module 120 determines whether a RSSI of the primary modem is greater than a first RSSI threshold and/or a BER of the primary modem is less than a first BET threshold. If this is true, then operation 406 is performed, otherwise operation 408 is performed. At 406, the modem selecting module 120 sets the primary modem, if not already active, to be the active modem. The secondary modem is set to be inactive. The method may end at 424 or proceed to operation 246 subsequent to operation 406.

At 408, the modem selecting module 120 determines whether a RSSI of a secondary modem is greater than a second RSSI threshold and/or a BER of the secondary modem is less than a second BER threshold. The second RSSI threshold may be the same or different than the first RSSI threshold. The second BER threshold may be the same or different than the first BER threshold. If this is true, operation 410 is performed, otherwise operation 412 is performed. At 410, the modem selecting module 120 sets the secondary modem, if not already active, to be the active modem. The primary modem is set to be inactive. The method may end at 424 or proceed to operation 246 subsequent to operation 410.

At 412, the modem selecting module 120 determines whether the RSSI of the primary modem is greater than the RSSI of the secondary modem and/or whether the BER of the primary modem is less than the BER of the secondary modem. If this is true, operation 406 may be performed, otherwise operation 410 may be performed.

At 414, the modem selecting module 120 determines whether the RSSI of the secondary modem is less than a third RSSI threshold and/or the BER of the secondary modem is greater than a third BER threshold. The third RSSI threshold may be the same or different than the first and second RSSI thresholds. The third BER threshold may be the same or different than the first and second BER threshold. If this is true, then operation 416 is performed, otherwise operation 418 is performed.

At 416, the modem selecting module 120 determines whether the RSSI of the primary modem is greater than the RSSI of the secondary modem plus a RSSI hysteresis value A and/or whether the BER of the primary modem is less than the BER of the secondary modem plus a BER hysteresis value A. If this is true, then operation 420 is performed, otherwise operation 422 is performed.

At 418, the modem selecting module 120 determines whether the RSSI of the primary modem is greater than the RSSI of the secondary modem plus a RSSI hysteresis value B and/or the BER of the primary modem is less than the BER of the secondary modem plus a BER hysteresis value B. If this is true, then operation 420 is performed, otherwise operation 422 is performed.

At 420, the modem selecting module 120 sets the primary modem, if not already active, to be the active modem. The secondary mode is set to be inactive. The method may end at 424 or proceed to operation 246 subsequent to operation 420.

At 422, the modem selecting module 120 sets the secondary modem, if not already active, to be the active modem. The primary modem is set to be inactive. The method may end at 424 or proceed to operation 246 subsequent to operation 422.

The above-described examples include monitoring a cellular network status of multiple modems, such as an attaching status and respective radio and signal quality parameters, and switching to and making one of the modems with the best data throughput as the active modem. This switch may occur independent of whether a current primary modem connection is completely broken. The switch may be performed before an active modem connection is completely broken. The SCTP protocol can switch a data path when an active data path is completely broken. The examples disclosed herein include continuously searching for a best data path and/or modem prior to an active data path being completely broken. Thus, a primary modem connection may be maintained and a data path may be switched to a higher throughput modem. The examples maintain one or more secondary modems as backups to replace a primary and/or active modem, should the data throughput capabilities of one of the secondary modems improve to be better than a data throughput of the primary or active modem. When this occurs a data path is switched from the primary and/or active modem to the secondary modem (or backup modem) with the better data throughput capabilities.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A telematics module comprising:
   a plurality of modems implemented in a vehicle; and
   a modem selecting module configured to communicate with a network device according to a stream control transmission protocol, the modem selecting module comprising:
      a radio access technology (RAT) network module configured to determine a RAT network availability status of each of the plurality of modems, and
      a signal status module configured to determine signal quality status parameters of each of the plurality of modems,
   wherein the modem selecting module is configured to determine which one of the plurality of modems has a higher data throughput based on the RAT network availability status and the signal quality status parameters of each of the plurality of modems,
   set the one of the plurality of modems with the higher data throughput as an active modem and set one or more other ones of the plurality of modems as inactive, such that the one or more other ones of the plurality of modems is in at least one of a standby or backup mode, and communicate with the network device via the one of the plurality of modems according to the stream control transmission protocol.

2. The telematics module of claim 1, wherein:

a first modem of the plurality of modems is an active modem prior to the setting of the one of the plurality of modems with the higher data throughput as an active modem;

the one of the plurality of modems with the higher data throughput is a second modem; and the modem selecting module is configured to maintain a connection with the network device and switch a data path from the first modem to the second modem in response to determining that the second modem has a higher data throughput than the first modem.

3. The telematics module of claim 1, wherein the modem selecting module is configured to:

determine which one of the plurality of modems is connected to a higher generation RAT network than another one of the plurality of modems;

set the one of the plurality of modems connected to the higher generation RAT network as an active modem; and communicate according to the stream control transmission protocol with the network device via the one of the plurality of modems connected to the higher generation RAT network.

4. The telematics module of claim 1, wherein the modem selecting module is configured to:

determine two of the plurality of modems connected to a same RAT network; in response to determining two of the plurality of modems are connected to a same RAT network, determine which of the two of the plurality of modems has better signal quality status parameters;

set the one of the two of the plurality of modems with the better signal quality status parameters as an active modem; and communicate with the network device via the one of the two of the plurality of modems according to the stream control transmission protocol.

5. The telematics module of claim 1, wherein the modem selecting module is configured to: determine which one of the plurality of modems has best signal quality status values; and communicate according to the stream control transmission protocol with the network device via the one of the plurality of modems having the best signal quality status values.

6. The telematics module of claim 1, wherein: the plurality of modems comprise a first modem and a second modem; and the signal status module is configured to perform a first comparison to determine whether a received signal strength indicator of the first modem is greater than a first threshold, perform a second comparison to determine whether a bit error rate of the first modem is less than a second threshold, and based on a result of the first comparison and a result of the second comparison, set the first modem as an active modem.

7. The telematics module of claim 6, wherein the signal status module is configured to: perform a third comparison to determine whether a received signal strength indicator of the second modem is greater than a third threshold;

perform a fourth comparison to determine whether a bit error rate of the second modem is less than a fourth threshold; and based on a result of the third comparison and a result of the fourth comparison, set the second modem as an active modem.

8. The telematics module of claim 7, wherein the signal status module is configured to:

perform a fifth comparison to determine whether the received signal strength indicator of the first modem is greater than the received signal strength indicator of the second modem; and based on a result of the fifth comparison, set one of the first modem and the second modem as an active modem.

9. The telematics module of claim 6, wherein the signal status module is configured to:

perform a third comparison to determine whether a received signal strength indicator of the second modem is less than a third threshold;

perform a fourth comparison to determine whether a bit error rate of the second modem is greater than a fourth threshold; and based on a result of the third comparison and a result of the fourth comparison, set one of the first modem and the second modem as an active modem.

10. The telematics module of claim 9, wherein the signal status module is configured to, based on the result of the third comparison and the result of the fourth comparison:

perform a fifth comparison to determine whether the received signal strength indicator of the first modem is greater than the received signal strength indicator of the second modem plus a hysteresis value;

perform a sixth comparison to determine whether the bit error rate of the first modem is less than the bit error rate of the second modem plus the hysteresis value;

and based on a result of the fifth comparison and a result of the sixth comparison, set one of the first modem and the second modem as an active modem.

11. A method of operating a telematics module comprising:

communicating with a network device according to a stream control transmission protocol;

determining a radio access technology (RAT) network availability status of each of a plurality of modems of the telematics module in a vehicle;

determining signal quality status parameters of each of the plurality of modems;

determining which one of the plurality of modems has a higher data throughput based on the RAT network availability status and the signal quality status parameters of each of the plurality of modems;

setting the one of the plurality of modems with the higher data throughput as an active modem and setting one or more other ones of the plurality of modems as inactive, such that the one or more other ones of the plurality of modems is in at least one of a standby or backup mode; and communicating with the network device via the one of the plurality of modems according to the stream control transmission protocol.

12. The method of claim 11, further comprising maintaining a connection with the network device and switching a data path from a first modem of the plurality of modems to a second modem of the plurality of modems in response to determining that the second modem has a higher data throughput than the first modem, wherein the first modem is an active modem prior to the setting of the second modem as an active modem.

13. The method of claim 11, further comprising: determining which one of the plurality of modems is connected to a higher generation RAT network than another one of the plurality of modems;
   setting the one of the plurality of modems connected to the higher generation RAT network as an active modem; and
   communicating according to the stream control transmission protocol with the network device via the one of the plurality of modems connected to the higher generation RAT network.

14. The method of claim 11, further comprising: determining two of the plurality of modems connected to a same RAT network; in response to determining two of the plurality of modems are connected to a same RAT network;
   determining which of the two of the plurality of modems has better signal quality status parameters;
   setting the one of the two of the plurality of modems with the better signal quality status parameters as an active modem; and
   communicating with the network device via the one of the two of the plurality of modems according to the stream control transmission protocol.

15. The method of claim 11, further comprising: determining which one of the plurality of modems has best signal quality status values; and
   communicating according to the stream control transmission protocol with the network device via the one of the plurality of modems having the best signal quality status values.

16. The method of claim 11, further comprising:
   performing a first comparison to determine whether a received signal strength indicator of a first modem is greater than a first threshold, wherein the plurality of modems comprise the first modem and a second modem;
   performing a second comparison to determine whether a bit error rate of the first modem is less than a second threshold; and
   based on a result of the first comparison and a result of the second comparison, setting the first modem as an active modem.

17. The method of claim 16, further comprising: performing a third comparison to determine whether a received signal strength indicator of the second modem is greater than a third threshold;
   performing a fourth comparison to determine whether a bit error rate of the second modem is less than a fourth threshold; and
   based on a result of the third comparison and a result of the fourth comparison, setting the second modem as an active modem.

18. The method of claim 17, further comprising: performing a fifth comparison to determine whether the received signal strength indicator of the first modem is greater than the received signal strength indicator of the second modem; and based on a result of the fifth comparison, setting one of the first modem and the second modem as an active modem.

19. The method of claim 16, further comprising: performing a third comparison to determine whether a received signal strength indicator of the second modem is less than a third threshold;
   performing a fourth comparison to determine whether a bit error rate of the second modem is greater than a fourth threshold; and
   based on a result of the third comparison and a result of the fourth comparison, setting one of the first modem and the second modem as an active modem.

20. The method of claim 19, further comprising, based on the result of the third comparison and the result of the fourth comparison:
   performing a fifth comparison to determine whether the received signal strength indicator of the first modem is greater than the received signal strength indicator of the second modem plus a hysteresis value;
   performing a sixth comparison to determine whether the bit error rate of the first modem is less than the bit error rate of the second modem plus the hysteresis value; and
   based on a result of the fifth comparison and a result of the sixth comparison, setting one of the first modem and the second modem as an active modem.

* * * * *